United States Patent Office 2,767,207
Patented Oct. 16, 1956

2,767,207

BETA (N-PROPYLAMINO) BETA, BETA-DIMETHYL ETHYL BENZOATE AND ITS WATER-SOLUBLE SALTS

Julian R. Reasenberg, Brooklyn, N. Y., assignor to Mizzy, Inc., a corporation of New York No Drawing. Application October 30, 1953,
Serial No. 389,463

7 Claims. (Cl. 260—477)

The present invention is concerned with local anesthetics suitable for injection into the tissues.

It is an object of this invention to provide a local anesthetic suitable for injection which has a potency greater than and a toxicity less than that of procaine.

It is another object of this invention to provide a local anesthetic suitable for injection, which anesthetic in the form of its salt has good water solubility and is more stable to oxidation and deterioration in water solution than procaine.

Other objects and advantages of this invention will be apparent from the following detailed description thereof.

In Patent 2,421,129, the subject matter of which was jointly invented by Samuel D. Goldberg and myself, there is disclosed for use as a surface anesthetic and also applicable by injection compounds having the general formula

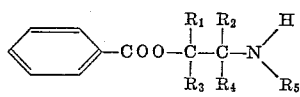

in which $R_1$, $R_2$, $R_3$ and $R_4$ may be either hydrogen or a lower alkyl group, such as methyl, and $R_5$ is an alkyl group containing from 4 to 8 carbon atoms. This patent states that compounds having the above structural formula in which $R_5$ is an alkyl group containing less than 4 carbon atoms tend to be unstable for practical use. As is evident from the published literature (Reasenberg, J. R., Doctoral Dissertation June 1941, Polytechnic Inst. of Brooklyn; Reasenberg, J. R. & Smith, G. B. L., Journal American Chemical Society, vol. 66, page 991 (1944); Reasenberg, J. R. & Goldberg, S. D., Journal American Chemical Society, vol. 67, page 933 (1945); and "Medicinal Chemistry" edited by C. M. Suter, John Wiley & Sons, Inc., 1951, pages 284–285) it was and has been prior to my invention, the generally accepted belief in this art that compounds corresponding to the above formula in which $R_5$ is an alkyl group containing less than 4 carbon atoms have a tendency towards unstability and to rearrange spontaneously to form compounds which are not local anesthetics. This tendency to rearrange is especially pronounced when the pH of the solution is comparatively high, as it is in the tissue of the body; on injection of a local anesthetic, the pH of the solution is rapidly brought into equivalence with that of the tissues by the body fluid.

I have made the surprising and unexpected discovery that beta (n-propylamino) beta, beta-dimethyl ethyl benzoate and particularly its water-soluble salts, e. g., the hydrochloride, are stable, are surprisingly effective as local anesthetics suitable for injection, are more potent and less toxic than (a) procaine and its water-soluble salts and (b) other alkyl amino alkyl benzoates, and are less irritating than such other alkyl amino alkyl benzoates.

Beta (n-propylamino) beta, beta-dimethyl ethyl benzoate has the formula

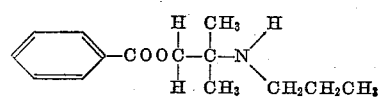

It is an oil substantially insoluble in water, but soluble in alcohol, ether, acetone and oils, such as olive oil, almond oil and other vegetable oils. It is useful as such as a topical local anesthetic being administrable in oil or alcohol solution. It is also useful as the base from which the water-soluble salts are readily produced by combination with the appropriate acid. Its hydrochloride has the empirical formula

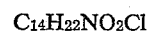

$$C_{14}H_{22}NO_2Cl$$

and is a crystalline solid which melts at 150° to 151° C., is soluble in water and contains about 13% by weight of chlorine.

The following example illustrates one method of synthesizing the hydrochloride; it will be understood the invention is not limited to this example.

78 grams of beta (n-propylamino) beta, beta-dimethyl ethanol is added to a solution of 30 grams of sodium hydroxide in 700 cc. of water. To this is added 300 cc. of ether and this is followed by the dropwise addition of 70 cc. of benzoyl chloride while stirring and cooling. The benzoyl chloride is added at such a rate that the temperature does no rise above 30° C. When the addition is complete, the stirring is continued for another 30 minutes. The aqueous layer is removed and the ether layer is washed with water, dried and evaporated to leave a yellow oil. This is treated slowly with 45 cc. of concentrated hydrochloric acid, during which addition a vigorous exothermic reaction ensues. When the reaction mixture is cooled it solidifies to a pasty solid which is allowed to dry. This is dissolved in boiling isopropanol and allowed to cool when white crystals of the hydrochloride are formed. The resultant slurry is filtered and the hydrochloride recrystallized from isopropanol to give white crystals which melt at 150°–151° C.

The compound of this invention is markedly less toxic and of higher potency than procaine. It is less toxic than beta (ethylamino) beta, beta-dimethyl ethyl benzoate, beta (isopropylamino) beta, beta-dimethyl ethyl benzoate, beta (n-butylamino) beta, beta-dimethyl ethyl benzoate, beta (isoamylamino) beta, beta-dimethyl ethyl benzoate. It is less irritating than beta (isopropylamino) beta, beta-dimethyl ethyl benzoate, beta (n-butylamino) beta, beta-dimethyl ethyl benzoate, beta (isobutylamino) beta, beta-dimethyl ethyl benzoate, and beta (n-amylamino) beta, beta-dimethyl ethyl benzoate. This is demonstrated by the results of the following tests:

*Test A.—Toxicity*

Comparative pharmacological tests were carried out involving the injection intraperitoneally (intestinal cavity) of the hydrochloride of the compounds enumerated in the table below. The test procedure involved determining the weight in milligrams of the compound subjected to test per kilogram of body weight of the animals (white mice) required to kill 50% of the animals. The greater the weight of the compound required to give 50% mortality, the less toxic the compound.

Table

| Compound Subjected to Test | Weight in Milligrams Required to Give 50% Deaths |
| --- | --- |
| 1. Compound of the invention | 250 |
| 2. Procaine hydrochloride | 200 |
| 3. Beta (ethylamino) beta, beta-dimethyl ethyl benzoate | 220 |
| 4. Beta (n-butylamino) beta, beta-dimethyl ethyl benzoate | 220 |
| 5. Beta (n-amylamino) beta, beta-dimethyl ethyl benzoate | 160 |

Tests on the rate of metabolism in human blood serums indicate that the compound of this invention is hydrolyzed 8 to 10 times more rapidly than procaine. In the lower animals this difference in rate of hydrolysis is much less. Hence, the relative toxicity of the compound of this invention compared to procaine in humans is even less than the above noted toxicity studies on the lower animals indicate.

Test B.—Irritation

Comparative pharmacological tests were carried out involving the injection intracutaneously of a 2% aqueous solution of the hydrochloride of the compounds under test in the animals (rabbits). The animals were inspected immediately after the injection took place to determine whether the skin showed signs of irritation. These tests showed no irritation for the compound of this invention, whereas beta (isopropylamino) beta, beta-dimethyl ethyl benzoate, beta (n-butylamino) beta, beta-dimethyl ethyl benzoate and beta (n-amylamino) beta, beta-dimethyl ethyl benzoate showed evident signs of irritation of the skin.

Test C.—Potency

One-half cc. of 2% procaine hydrochloride solution when injected in the sciatic nerve of a rat required 5 minutes for onset of anesthesia and lasted 95 minutes. A similar test in similar amount and concentration of the hydrochloride of the compound of this invention showed an onset of anesthesia in less than 2 minutes and gave anesthesia lasting 290 minutes.

The concentration of the compound of this invention which gave anesthesia under the conditions of the test for as long as 2% procaine was found to be only ¾ths of 1% and even at this low concentration the onset of anesthesia took place in one-half the time required of procaine.

Test D.—Dental anesthesia

In comparative tests on human beings for dental anesthesia, the compound of this invention in a concentration of 2% gave anesthesia which was superior to a 4% procaine solution in onset, depth of anesthesia and duration.

From the above it will be noted that the anesthetic potency of the compound of this invention is considerably greater than that of procaine, while its toxicity is less. Furthermore, the compound of this invention is materially less irritating than beta (isopropylamino) beta, beta-dimethyl ethyl benzoate, beta (n-butylamino) beta, beta-dimethyl ethyl benzoate and beta (n-amylamino) beta, beta-dimethyl ethyl benzoate. It is substantially less toxic than beta (ethylamino) beta, beta-dimethyl ethyl benzoate, beta (n-butylamino) beta, beta-dimethyl ethly benzoate, and beta (n-amylamino) beta, beta-dimethyl ethyl benzoate. Moreover, the compound of this invention is extremely stable, may be sterilized by heat without decomposition and is resistant to oxidation.

As water-soluble salts of the base, the hydrochloride is preferred, although other water-soluble salts, such as nitrate, hydrobromide, sulfate, acetate, propionate, etc. may be employed. The nitrate has a melting point of 115°–116° C., the hydrobromide a melting point of 164°–165° C., and the normal sulfate a melting point of 201°–202° C.

It will be understood that all matter contained in the above description shall be interpreted as illustrative and not in a limiting sense.

Having thus described my invention, what I claim as new and desire to secure by Letters Patent is:

1. A local anesthetic suitable for use by injection from the group consisting of beta (n-propylamino) beta, beta-dimethyl ethyl benzoate and its water-soluble salts.

2. As a local dental injectable anesthetic having high potency and low toxicity, beta (n-propylamino) beta, beta-dimethyl ethyl benzoate.

3. As local dental injectable anesthetics having high potency and low toxicity, the water-soluble salts of beta (n-propylamino) beta, beta-dimethyl ethyl benzoate.

4. As a local dental injectable anesthetic having high potency and low toxicity, beta (n-propylamino) beta, beta-dimethyl ethyl benzoate hydrochloride.

5. As a local dental injectable anesthetic having high potency and low toxicity, beta (n-propylamino) beta, beta-dimethyl ethyl benzoate hydrobromide.

6. As a local dental injectable anesthetic having high potency and low toxicity, beta (n-propylamino) beta, beta-dimethyl ethyl benzoate normal sulfate.

7. As a local dental injectable anesthetic having high potency and low toxicity, beta (n-propylamino) beta, beta-dimethyl ethyl benzoate nitrate.

References Cited in the file of this patent

UNITED STATES PATENTS 2,421,129    Reasenberg et al. _____ May 27, 1947

OTHER REFERENCES

Reasenberg et al.: J. Am. Chem. Soc. 67, 936 (1945).